(12) United States Patent
Wang (10) Patent No.: US 6,824,217 B1
(45) Date of Patent: Nov. 30, 2004

(54) HEIGHT ADJUSTABLE ARMREST ASSEMBLY FOR A CHAIR

(75) Inventor: Yu-Jen Wang, Tainan Hsien (TW)

(73) Assignee: Fu Luong Hi-Tech Co., Ltd. (TW)

( * ) Notice: Subject to any disclaimer, the term of this patent is extended or adjusted under 35 U.S.C. 154(b) by 0 days.

(21) Appl. No.: 10/663,018

(22) Filed: Sep. 16, 2003

(51) Int. Cl.7 .................................................. A47C 7/54
(52) U.S. Cl. .................................................. 297/411.36
(58) Field of Search .................................... 297/411.36

(56) References Cited

U.S. PATENT DOCUMENTS

| | | | | |
|---|---|---|---|---|
| 3,950,027 A | * | 4/1976 | Wilson | 297/411.27 |
| 5,636,899 A | * | 6/1997 | Schiff et al. | 297/411.36 |
| 5,749,629 A | * | 5/1998 | Heath et al. | 297/411.36 |
| 5,908,221 A | * | 6/1999 | Neil | 297/411.36 |
| 5,931,536 A | * | 8/1999 | Wu | 297/411.35 |
| 6,702,386 B2 | * | 3/2004 | Davis et al. | 297/411.35 |

* cited by examiner

Primary Examiner—Peter M. Cuomo
Assistant Examiner—Joseph Edell
(74) Attorney, Agent, or Firm—Ostrolenk, Faber, Gerb & Soffen, LLP (57) ABSTRACT

An armrest assembly includes a lower part defining a lower chamber, and an upper part defining an upper chamber therein. An abutting member is disposed in the upper chamber. A cylinder-and-piston unit includes a cylinder extending into the upper chamber to abut against the abutting member, and a piston mounted securely in the lower chamber and telescopically extending into the cylinder. A locking member includes a spring-biased button projecting from the cylinder, extending through the abutting member and into the upper chamber, and pressible to move between a locked position, in which, the cylinder is locked by the locking member against axial movement relative to the piston, and an unlocked position, in which, the cylinder is axially movable relative to the piston.

2 Claims, 7 Drawing Sheets

HEIGHT ADJUSTABLE ARMREST ASSEMBLY FOR A CHAIR

BACKGROUND OF THE INVENTION

1. Field of the Invention

The present invention relates to an armrest assembly, more particularly to a height adjustable armrest assembly for a chair.

2. Description of the Related Art

Figure 1:
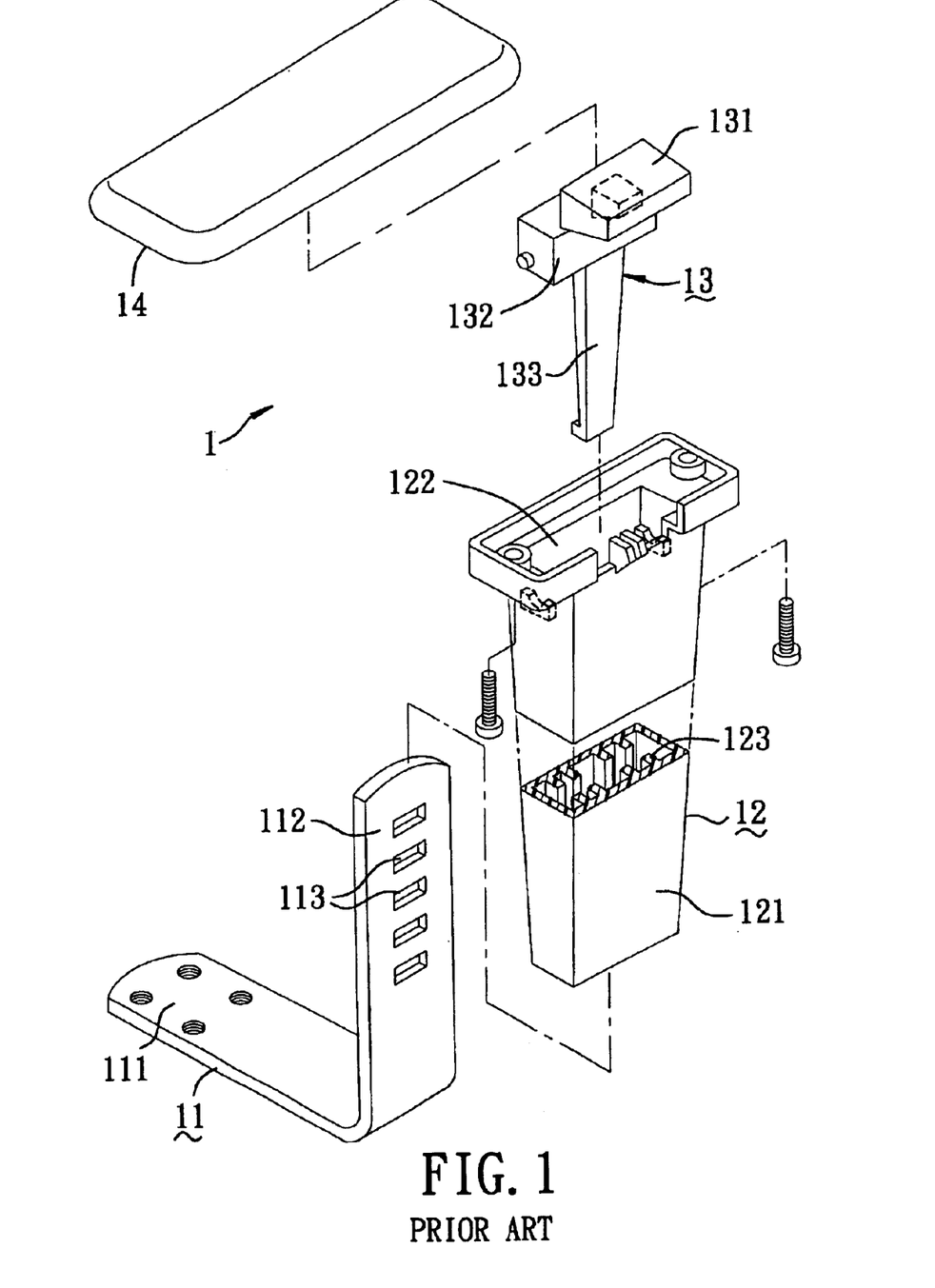
FIG. 1 is an exploded, perspective and fragmentary sectional view of a conventional height adjustable armrest assembly for a chair.
Figure 2:
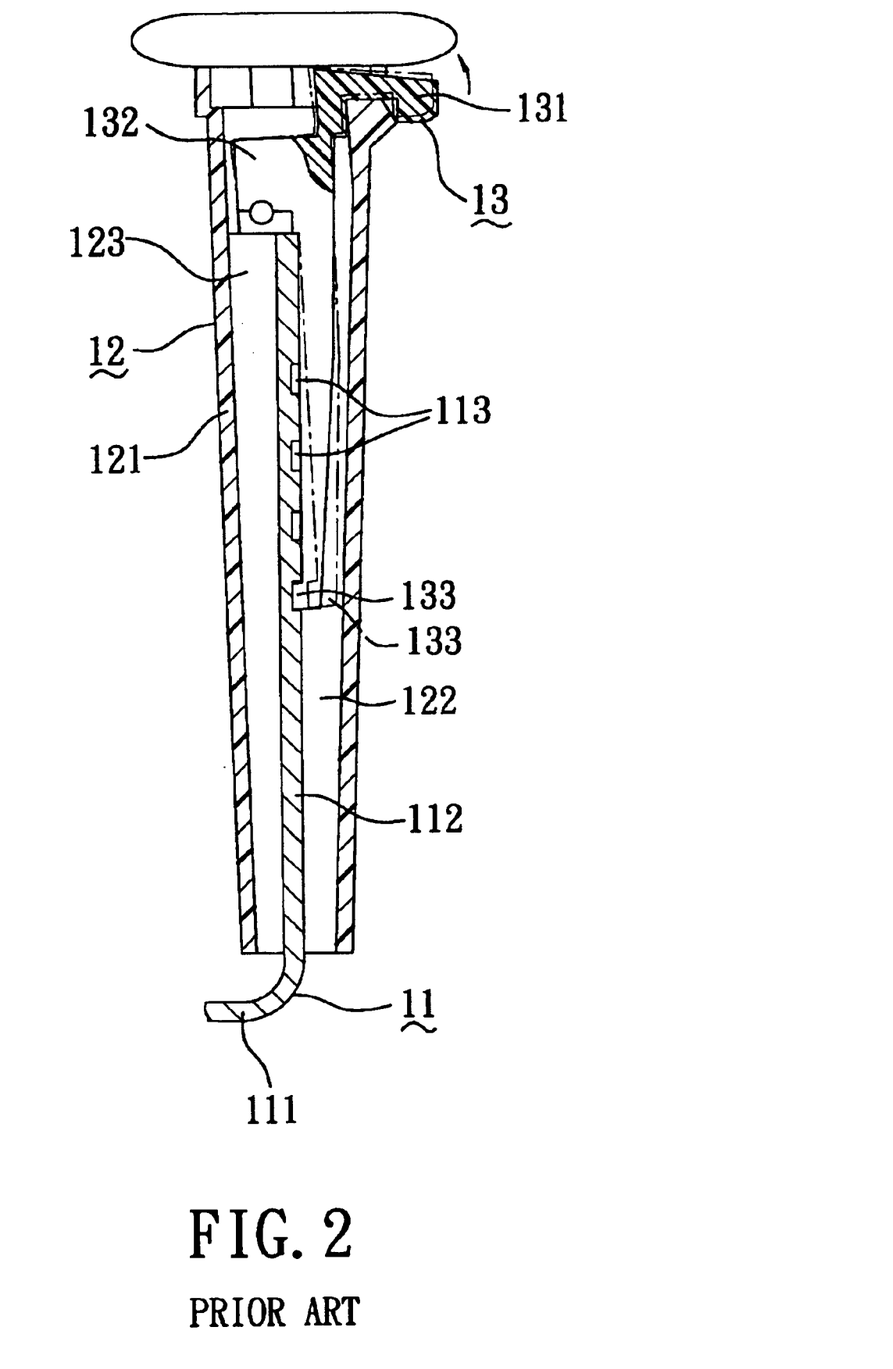
FIG. 2 is a sectional side view of the conventional height adjustable armrest assembly.

Referring to FIGS. 1 and 2, a conventional height adjustable armrest assembly 1 is shown to include an L-shaped support 11, a vertical sleeve 12, a lever body 13, and an armrest 14.

The support 11 includes a horizontal part 111 adapted to be fixed on a bottom side of a chair (not shown), and a vertical part 112 that extends upwardly from one end of the horizontal part 111 and that is formed with vertically aligned positioning grooves 113. The vertical sleeve 12 is sleeved slidably on the vertical part 112, has a peripheral wall 121 defining a receiving space 122 for receiving the vertical part 112 therein, and is formed with a plurality of limiting ribs 123 which contact slidably the vertical part 112 so as to prevent wobbling of the peripheral wall 121 relative to the vertical part 112. The lever body 13 has an upper block portion 132 pivoted to the peripheral wall 121, an engaging portion 133 extending from the upper block portion, 132 into the receiving space 122 to releasably engage a selected one of the positioning grooves 113, and an operating portion 131 connected to the upper block portion 132 and exposed from the peripheral wall 121. The armrest 14 is mounted on the vertical sleeve 12. When the operating portion 131 is lifted upward as shown in FIG. 2, the lever body 13 swings in the vertical sleeve 12 to permit disengagement of the engaging portion 133 from the selected one of the positioning grooves 113.

It is relatively inconvenient and laborious to adjust the height of the armrest 14. Moreover, since the distance between adjacent ones of the positioning grooves 113 is fixed, height adjustment of the conventional armrest assembly lacks flexibility.

A height adjustable armrest assembly for a chair according to U.S. Pat. No. 5,908,221 discloses an armrest support adapted to be fixed on a seat of the chair, an armrest mounted rotatably on the armrest support, a hydraulic cylinder secured in the armrest support, a piston rod secured to the armrest and exposed to ambience when the armrest is lifted relative to the armrest support by the piston rod, and a lever unit mounted in the armrest for actuating the piston rod.

Disadvantages of Patent '221 are as follows:
(1) Since the outer surface of the piston rod is normally applied with lubricant thereon, the user may accidentally contact the lubricant when the piston rod is raised and exposed to the ambience.
(2) Since the armrest and the top end of the armrest support cooperatively form a gap therebetween when the piston rod is raised, objects, such as clothes, fingers, etc., may be accidentally clamped therebetween when the armrest together with the piston rod is lowered down to the top end of the armrest support.

SUMMARY OF THE INVENTION

Therefore, the object of this invention is to provide a height adjustable armrest assembly for a chair that is capable of overcoming the aforesaid disadvantages of the prior art.

Accordingly, a height adjustable armrest assembly of the present invention for a chair includes: a support unit including a lower part defining a lower chamber, and an upper part that defines an upper chamber therein, that is movable relative to the lower part, and that has an abutting member disposed within the upper chamber and subdividing the upper chamber into an upper portion and a lower portion; an armrest mounted on the upper part so as to be movable together therewith; a cylinder-and-piston unit including a cylinder that extends into the lower portion of the upper chamber to abut against the abutting member and that has opposite upper and lower ends, a piston mounted securely in the lower chamber and telescopically extending into the lower end of the cylinder, and a locking member including a spring-biased button projecting upwardly from the upper end of the cylinder, extending through the abutting member and into the upper portion of the upper chamber, and pressible to move between a locked position, in which, the cylinder is locked by the locking member against axial movement relative to the piston, and an unlocked position, in which, the cylinder is released by the locking member so as to be axially movable relative to the piston; and a control knob mounted movably on the upper part of the support unit, engaging the button, and operable so as to move the button from the locked position to the unlocked position.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 3:
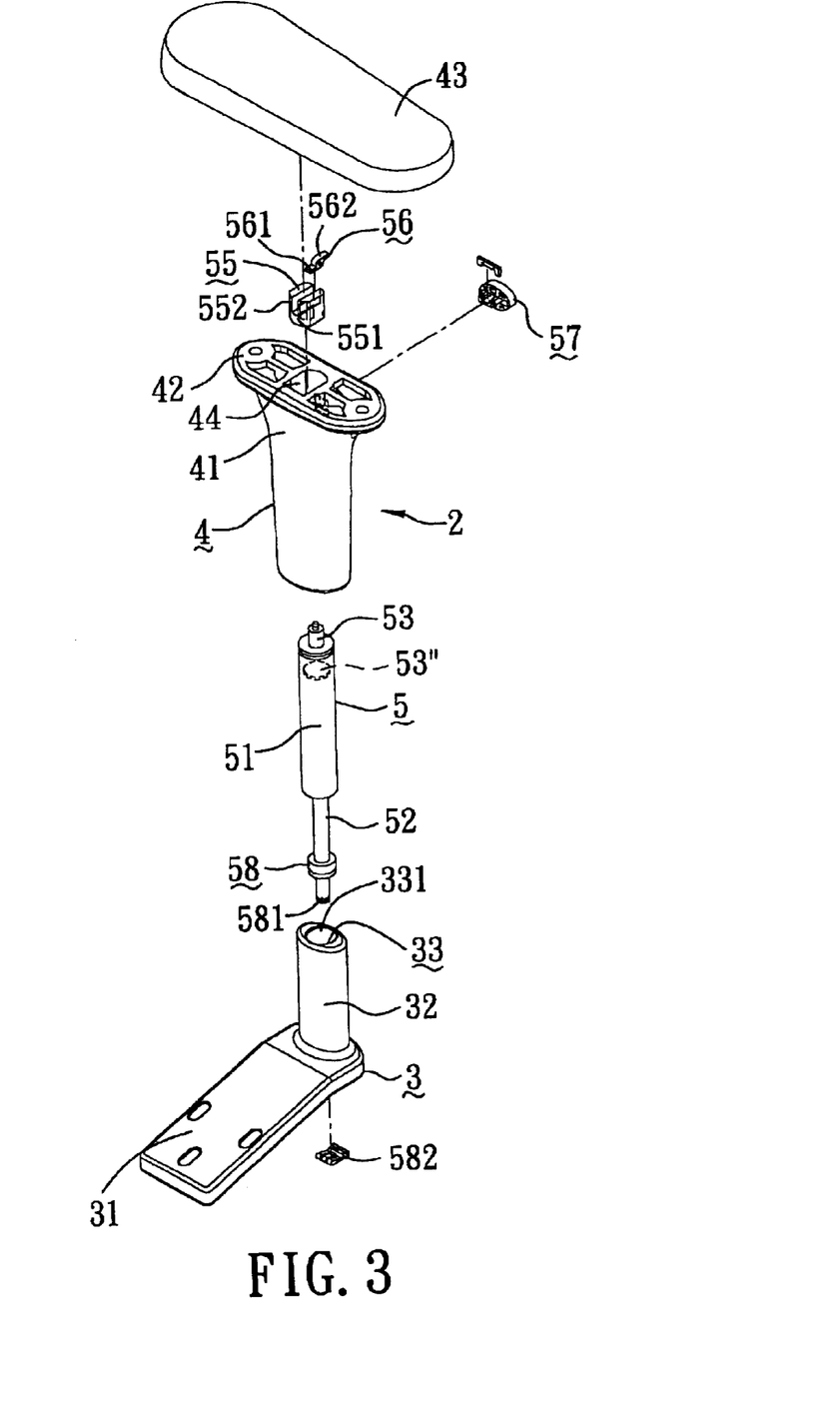
FIG. 3 is an exploded perspective view of the preferred embodiment of a height adjustable armrest assembly of the present invention for a chair.
Figure 4:
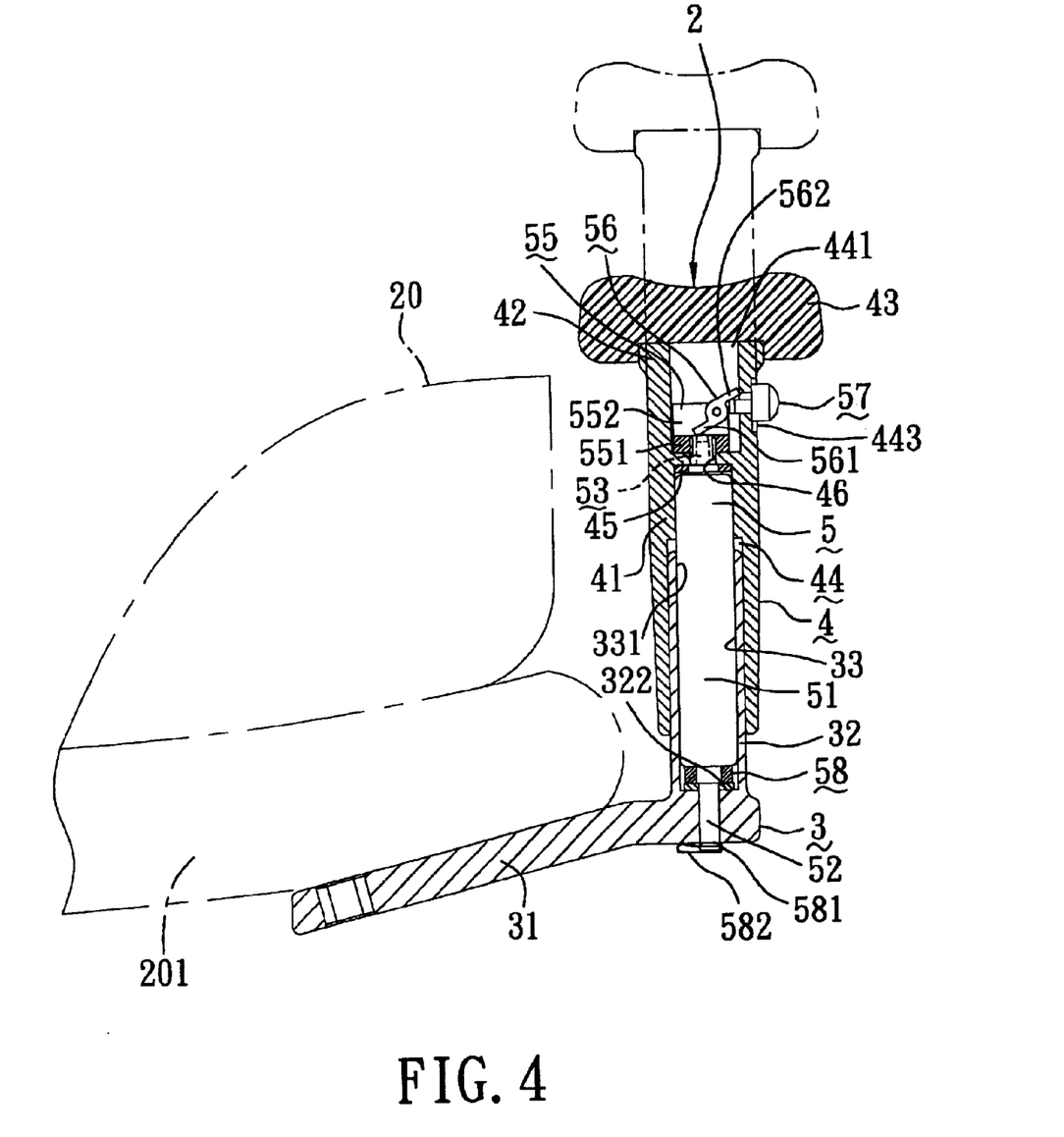
FIG. 4 is a sectional view illustrating how the preferred embodiment is mounted on a bottom side of a seat unit of the chair.
Figure 5:
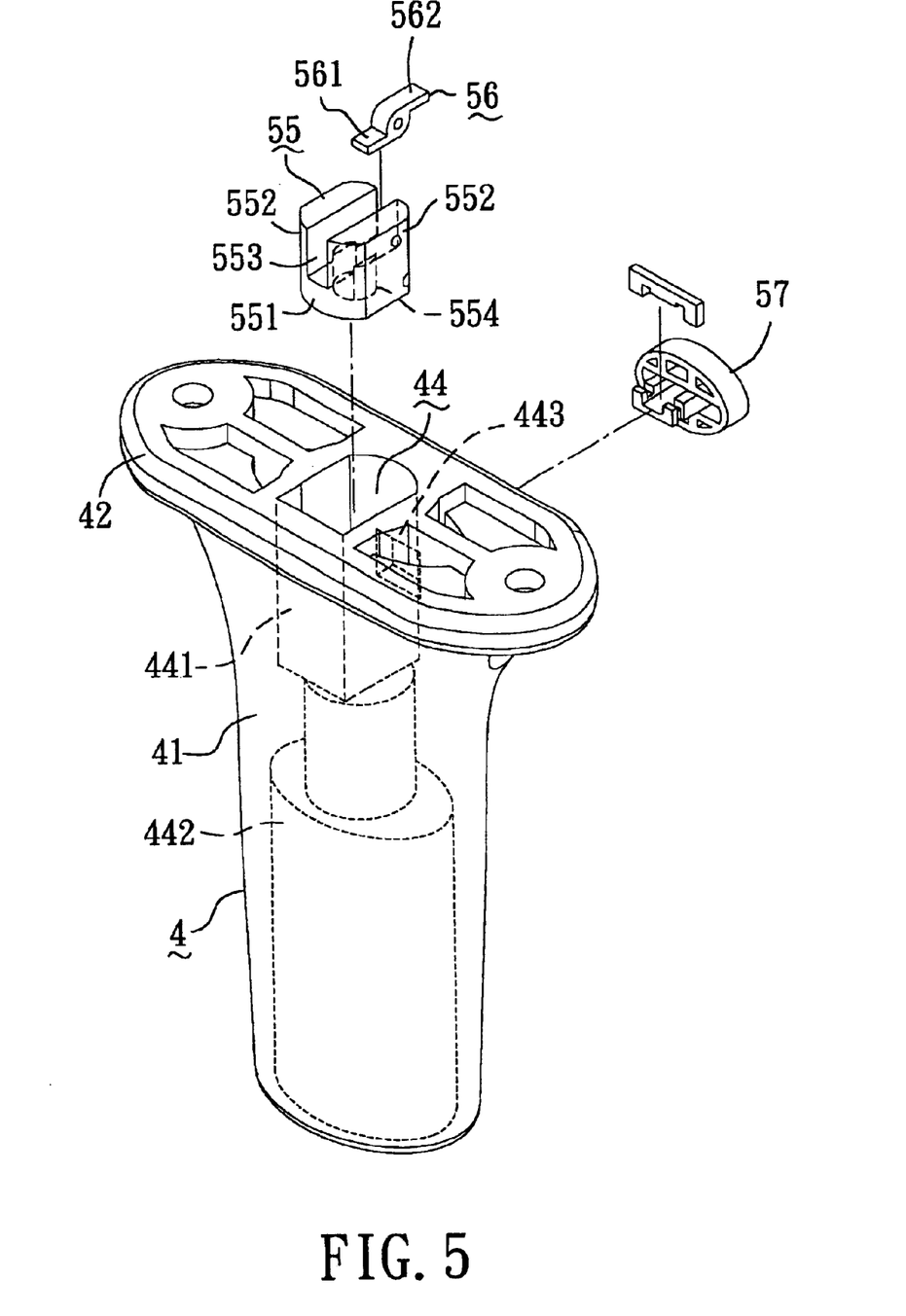
FIG. 5 is a perspective and partly exploded view of the preferred embodiment.

Referring to FIGS. 3 to 5, the preferred embodiment of a height adjustable armrest assembly according to the present invention for a chair is shown to include a support unit 2, an armrest 43, a pneumatically operated cylinder-and-piston unit 5, and a control knob 57.

As illustrated, the support unit 2 includes a lower part 3 and an upper part 4. The lower part 3 includes a mounting base 31 adapted to be fixed to a bottom side of a seat unit 201 of a chair 20 (shown by dotted lines in FIG. 4) and a vertical portion 32 extending upwardly from the mounting base 31.

The vertical portion 32 of the lower part 3 has an upper end 331, and defines a lower chamber 33. The upper part 4 is movable relative to the vertical portion 32 of the lower part 3, and has a peripheral wall 41 defining an upper chamber 44 therein. An abutting member 45 extends inwardly from the peripheral wall 41 into the upper chamber 44, and subdivides the upper chamber 44 into an upper portion 441 and a lower portion 442. The abutting member 45 is formed with a through hole 46 in spatial communication with the upper and lower portions 441,442 of the upper chamber 44.

The armrest 43 is mounted on a top end 42 of the peripheral wall 41 of the upper part 4 so as to be movable together therewith.

Figure 6:
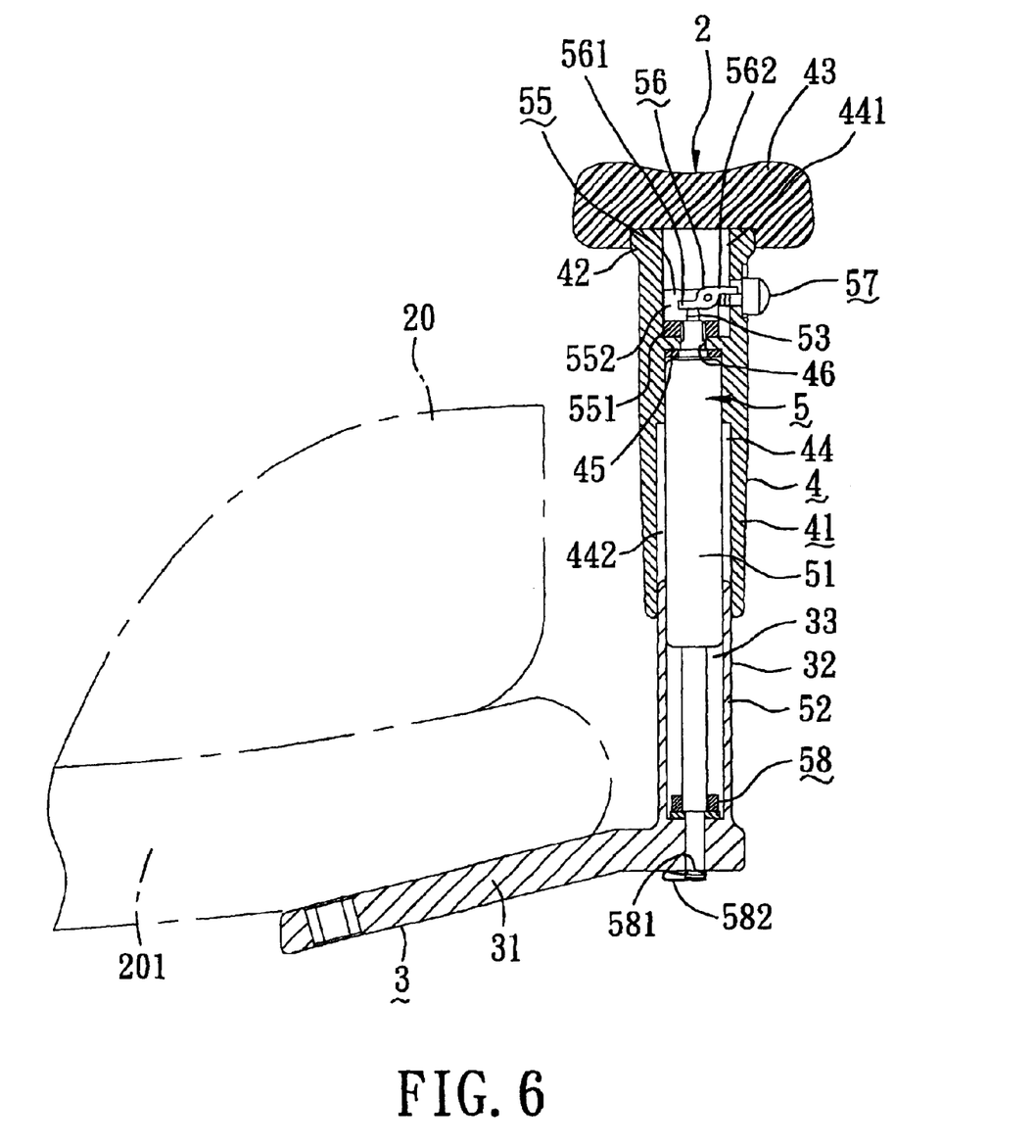
FIG. 6 is a sectional side view illustrating how the height of the preferred embodiment is adjusted relative to the seat unit of the chair.

The cylinder-and-piston unit 5 includes a cylinder 51, a piston 52, a locking member 53", a lever-holding seat 55, and an actuating lever 56. The cylinder 51 extends into the lower portion 442 of the upper chamber 44 to abut against the abutting member 45, and has opposite upper and lower ends. The piston 52 is mounted securely in the lower chamber 33 in the vertical portion 32 through a sleeve 58 that is fastened securely on a lower end of the piston 52 and that is seated on a bottom end 322 of the lower chamber 33 and a fastener 582 which engages an annular recess 581 formed in the lower end of the piston 52 and which abuts against the mounting base 31 so as to prevent disengagement of the piston 52 from the lower part 3. An upper end of the piston 52 extends telescopically into the lower end of the cylinder 51. The locking member 53" is mounted on the upper end of the cylinder 51, and includes a spring-biased button 53 projecting upwardly from the upper end of the cylinder 51 into the upper portion 441 of the upper chamber 44 through the hole 46 in the abutting member 45. The button 53 is pressible to move between a locked position, in which, the cylinder 51 is locked by the locking member 53" against axial movement relative to the piston 52, as shown in FIG. 4, and an unlocked position, in which, the cylinder 51 is released by the locking member 53" so as to be axially movable relative to the is piston 52, as shown in FIG. 6.

The control knob 57 is mounted movably on the upper part 4 of the support unit 2, engages the button 53, and is operable so as to move the button 53 to the unlocked position.

Figure 7:
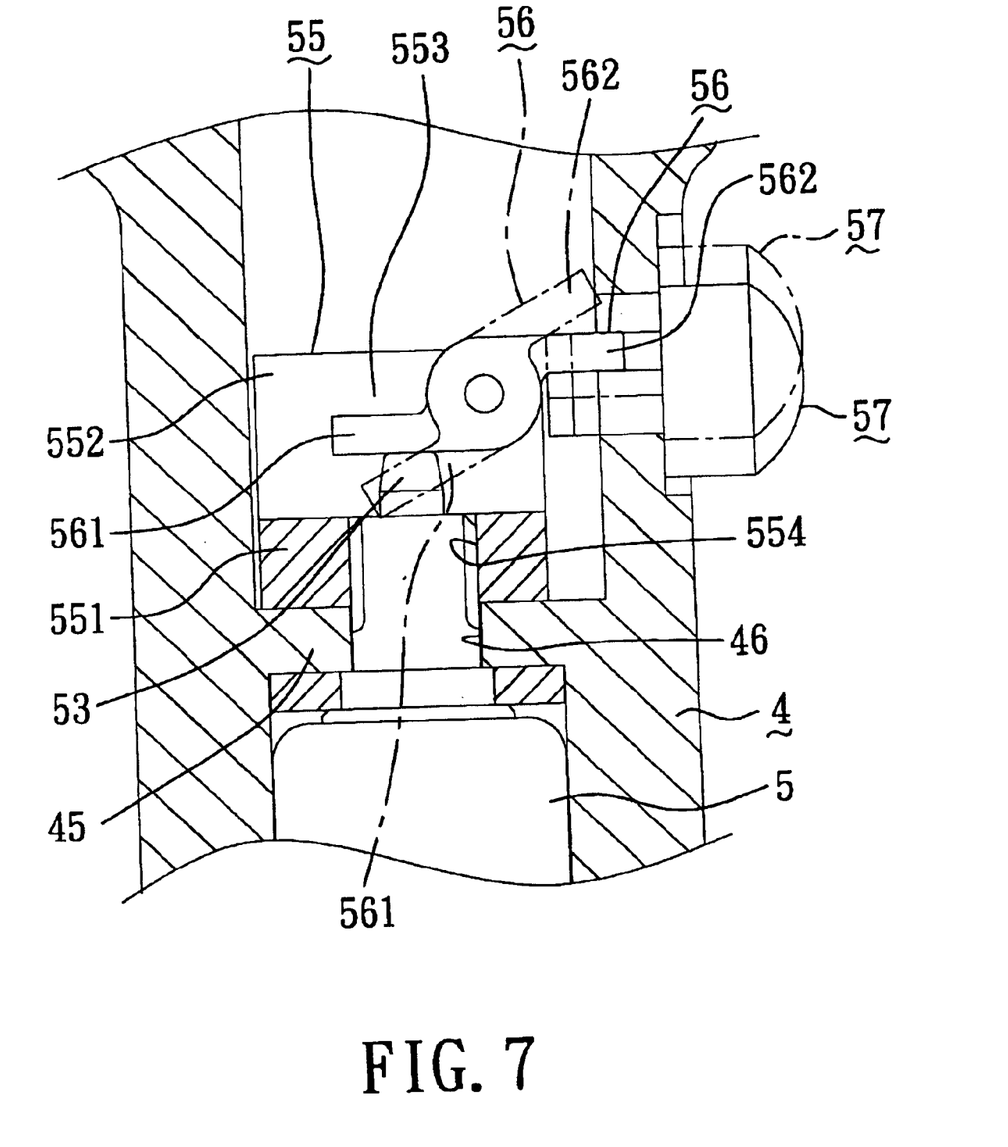
FIG. 7 is a fragmentary sectional view, illustrating how a control knob is operated in order to actuate a spring-biased button so as to move a cylinder relative to a piston of a cylinder-and-piston unit that is employed in the preferred embodiment.

In this preferred embodiment, the peripheral wall 41 of the upper part 4 is formed with a knob-retention slot 443 that is in spatial communication with the upper portion 441 of the upper chamber 44 and that receives the control knob 57 therein. The lever-holding seat 55 is disposed within the upper portion 441 of the upper chamber 44 in the upper part 4, and has a bottom portion 551 that is seated on the abutting member 45 and that is formed with a bottom hole 554 to permit extension of the button 53 therethrough, and two parallel portions 552 extending from two opposite sides of the bottom portion 551 to define a receiving space 553 therebetween. The actuating lever 56 is disposed in the receiving space 553, is pivoted to the parallel portions 552 of the lever-holding seat 55, and has opposite ends 561, 562 respectively in contact with the button 53 and the control knob 57. Movement of the control knob 57 to an upper position along the knob-retention slot 443 by virtue of an applied external force results in turning of the actuating lever 56 (shown by dotted lines in FIG. 7) in a first direction, which, in turn, forces the button 53 to the unlocked position. Movement of the control knob 57 to a lower position along the slot 443 and turning of the actuating lever 56 (shown by solid lines in FIG. 7) in a second direction opposite to the first direction results in restoring the button 53 to the locked position.

By virtue of the cylinder-and-piston unit 5 of the height adjustable armrest assembly of the present invention, the aforesaid disadvantages of the prior art can be eliminated.

With this invention thus explained, it is apparent that numerous modifications and variations can be made without departing from the scope and spirit of this invention. It is therefore intended that the invention be limited only as indicated in the appended claims.

I claim:

1. A height adjustable armrest assembly for a chair, comprising: a support unit including a lower part defining a lower chamber, and an upper part that defines an upper chamber therein, that is movable relative to said lower part, and that has an abutting member disposed within said upper chamber and subdividing said upper chamber into an upper portion and a lower portion;

an armrest mounted on said upper part so as to be movable together therewith;

a cylinder-and-piston unit including a cylinder that extends into said lower portion of said upper chamber to abut against said abutting member and that has opposite upper and lower ends, a piston mounted securely in said lower chamber and telescopically extending into said lower end of said cylinder, and a locking member including a spring-biased button projecting upwardly from said upper end of said cylinder, extending through said abutting member and into said upper portion of said upper chamber and pressible to move between a locked position, in which, said cylinder is locked by said locking member against axial movement relative to said piston and an unlocked position, in which, said cylinder is released by said locking member so as to be axially movable relative to said piston; and a control knob mounted movably on said upper part of said support unit, engaging said button, and operable so as to move said button from said locked position to said unlocked position said upper chamber and that is formed with a knob-retention slot which is in spatial communication with said upper portion of said upper chamber and which receives said control knob therein, said cylinder-and-piston assembly further including a lever-holding seat disposed within said upper portion of said upper chamber in said upper part and having a bottom portion that is seated on said abutting member and that is formed a bottom hole to permit extension of said button therethrough, and two parallel portions extending from two opposite sides of said bottom portion, and an actuating lever pivoted to said parallel portions of said lever-holding seat and having opposite ends respectively in contact with said button and said control knob in such a manner that movement of said control knob to an upper position along said knob-retention slot results in turning of said actuating lever in a first direction, which, in turn, forces said button to said unlocked position, and that movement of said control knob to a lower position along said slot results in turning said actuating lever in a second direction opposite to said first direction and restoring of said button to said locked position;

said upper chamber and that is formed with a knob-retention slot which is in spatial communication with said upper portion of said upper chamber and which receives said control knob therein, said cylinder-and-piston unit further including a lever-holding seat disposed within said upper portion of said upper chamber in said upper part and having a bottom portion that is seated on said abutting member and that is formed with a bottom hole to permit extension of said button therethrough, and two parallel portions extending from two opposite sides of said bottom portion, and an actuating lever pivoted to said parallel portions of said lever-holding seat and having opposite ends respectively in contact with said button and said control knob in such a manner that movement of said control knob to an upper position along said knob-retention slot results in turning of said actuating lever in a first direction, which, in turn, forces said button to said unlocked position, and that movement of said control knob to a lower position along said knob-retention slot results in turning said actuating lever in a second direction opposite to said first direction and restoring of said button to said locked position.

2. The height adjustable armrest assembly as defined in claim 1, wherein said cylinder-and-piston assembly is pneumatically operated.

* * * * *